(No Model.)
J. E. PRUNTY.
SHUT-OFF COCK FOR NOZZLES.
No. 316,913. Patented Apr. 28, 1885.
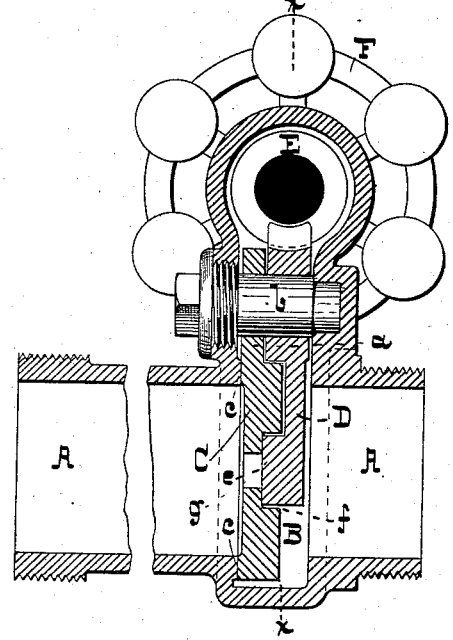
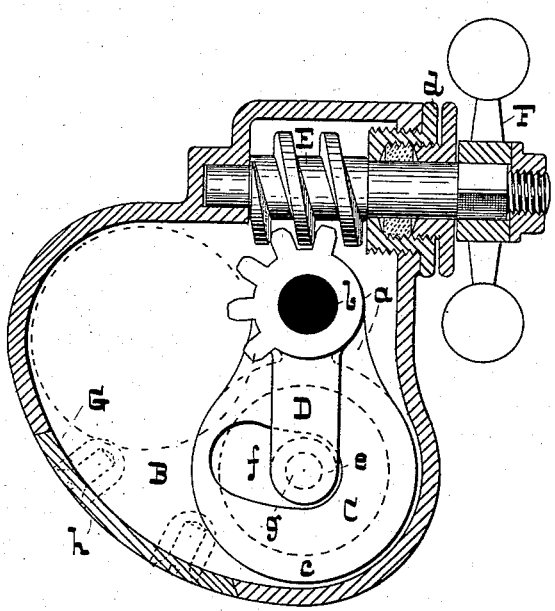
WITNESSES
Danl Fisher
Chas. W. Arnold
INVENTOR
John E. Prunty,
by G. H. & W. T. Howard,
attys.

UNITED STATES PATENT OFFICE.

JOHN E. PRUNTY, OF BALTIMORE, MARYLAND.

SHUT-OFF COCK FOR NOZZLES.

SPECIFICATION forming part of Letters Patent No. 316,913, dated April 28, 1885.

Application filed January 26, 1885. (No model.)

*To all whom it may concern:*

Be it known that I, JOHN E. PRUNTY, of the city of Baltimore and State of Maryland, have invented certain Improvements in Shut-Off Cocks for Hose-Pipe Nozzles, of which the following is a specification.

In the drawings forming a part hereof, Figure I is a longitudinal section of a part of a hose-pipe nozzle and my improved shut-off cock. Fig. II is a cross-section of the same, taken on the dotted line $x$ $x$.

A is a pipe, which is here shown as constituting a portion of a hose-pipe nozzle; and B, a chamber formed in the said pipe.

C is a disk or plate, somewhat larger than the inner diameter of the pipe A, having a perforated extension, $a$, through which is passed the pivotal bolt $b$. The disk rests on and forms a water-tight joint with the face $c$ in the chamber B, and the chamber is of such size as to admit of the disk being moved therein entirely clear of the pipe-opening, as shown in dotted lines, Fig. II.

D is an arm adapted to vibrate freely on the pivotal bolt $b$ within the chamber B. The hub of this arm is toothed to admit of its engagement with a worm, E, confined in the chamber B. The body of the worm projects through a packing-box, $d$, in the side of the chamber B, and is provided with a hand-wheel, F. The free end of the arm D has a projection, $e$, which rests in a rabbet, $f$, in the disk C, and covers, when in one position, a hole, $g$.

When a small stream of water is required to extinguish a fire in its incipiency, the arm D is moved only until the hole $g$ is uncovered; but should a stream equal to the full size of the pipe be necessary the arm is moved after its projection $e$ has reached the end of the rabbet $f$, and the disk is thereby carried entirely clear of the bore of the pipe. An aperture, G, in the side of the chamber B and covered by a plate, $h$, is to admit of the introduction of the disk and its connections to the chamber.

It is obvious that the chamber B may be made separate from the pipe and secured thereto, instead of being formed as a part of the pipe, as shown, without affecting the character of the invention.

I claim as my invention—

In a pipe, a chamber having therein a vibratory disk with a rabbet and a hole, substantially as shown, combined with a vibratory arm having a toothed hub, and a free end provided with a projection which rests in the said rabbet, and a worm in gear with the said toothed hub, substantially as specified.

JOHN E. PRUNTY.

Witnesses:
CHAS. W. ARNOLD,
DANL. FISHER.